(12) United States Patent
Xu et al.

(10) Patent No.: US 10,498,438 B2
(45) Date of Patent: Dec. 3, 2019

(54) AUTOMATIC CALIBRATION OF LOOPBACK DATA IN LINE MONITORING SYSTEMS

(71) Applicant: SubCom, LLC, Eatontown, NJ (US)

(72) Inventors: Yunlu Xu, Howell, NJ (US); Richard Kram, Ocean, NJ (US); Jonathan M. Liss, Marlboro, NJ (US)

(73) Assignee: Subcom, LLC, Eatontown, NJ (US)

( * ) Notice: Subject to any disclaimer, the term of this patent is extended or adjusted under 35 U.S.C. 154(b) by 0 days.

(21) Appl. No.: 15/875,734

(22) Filed: Jan. 19, 2018

(65) Prior Publication Data

US 2019/0229803 A1 Jul. 25, 2019

(51) Int. Cl.
| | | |
|---|---|---|
| *H04B 10/00* | (2013.01) | |
| *H04B 17/00* | (2015.01) | |
| *H04B 10/077* | (2013.01) | |
| *H04B 10/079* | (2013.01) | |
| *H04B 10/035* | (2013.01) | |
| *H04J 14/02* | (2006.01) | |
| *H04B 10/07* | (2013.01) | |

(52) U.S. Cl.
CPC ....... *H04B 10/0775* (2013.01); *H04B 10/035* (2013.01); *H04B 10/07* (2013.01); *H04B 10/0771* (2013.01); *H04B 10/0777* (2013.01); *H04B 10/0791* (2013.01); *H04J 14/02* (2013.01); *H04B 2210/07* (2013.01)

(58) Field of Classification Search
CPC .............. H04B 10/0775; H04B 10/035; H04B 10/0791
USPC ...................... 398/37, 17, 16, 177
See application file for complete search history.

(56) References Cited

U.S. PATENT DOCUMENTS

| | | | | | |
|---|---|---|---|---|---|
| 6,134,032 A | * | 10/2000 | Kram | ................... | H04B 10/035 398/1 |
| 6,323,981 B1 | * | 11/2001 | Jensen | ................. | H04B 10/071 398/11 |
| 6,414,775 B1 | * | 7/2002 | Pedersen | .............. | H04B 10/071 398/177 |
| 2007/0041006 A1 | * | 2/2007 | Abbott | ................. | H04B 10/071 356/73.1 |
| 2009/0028550 A1 | * | 1/2009 | Zhang | ................. | H04B 10/035 398/16 |
| 2009/0202237 A1 | * | 8/2009 | Zhang | ................. | H04B 10/035 398/6 |
| 2009/0324249 A1 | * | 12/2009 | Zhang | ................. | H04B 10/035 398/177 |
| 2010/0209110 A1 | * | 8/2010 | Pelouch | ............. | H04B 10/2916 398/92 |
| 2012/0045205 A1 | | 2/2012 | Perron | | |
| 2013/0129343 A1 | * | 5/2013 | Kram | ................. | H04B 10/0773 398/17 |

(Continued)

OTHER PUBLICATIONS

Extended European Search Report dated Jul. 3, 2019 for European Patent application No. 19152141.8.

*Primary Examiner* — David C Payne
*Assistant Examiner* — Pranesh K Barua

(57) ABSTRACT

A system and method for automatically calibrating loopback data in a line monitoring system of an optical communication system. Extra peaks in loopback data are calibrated out of the loopback data used by the system by identifying pairs of peaks in the loopback data associated with test signal transmissions through the same high loss loopback path from opposite ends of the optical transmission path.

9 Claims, 5 Drawing Sheets

(56) References Cited

U.S. PATENT DOCUMENTS

2014/0212131 A1\* 7/2014 Zhang ................ H04B 10/0771
                                                    398/16
2015/0171958 A1\* 6/2015 Webb ................... H04B 10/071
                                                    398/37

\* cited by examiner

AUTOMATIC CALIBRATION OF LOOPBACK DATA IN LINE MONITORING SYSTEMS

TECHNICAL FIELD

The present application relates to communication systems and, more particularly, to a system and method for automatic calibration of loopback data in line monitoring systems.

BACKGROUND

Subsea fiber optical communications systems need routine monitoring to guarantee their performance and minimize potential loss of service by detecting and solving wet plant faults and possibly aggressive threats at an early stage. Currently established monitoring technologies include the use of line monitoring systems (LMS) to detect signal peaks looped back from each undersea repeater and terminal with high loss loopback (HLLB) technology. Signal peaks are expected to loopback within an expected range of time due to the fixed length of optical fiber between undersea repeaters. For example, if a repeater is 200 km away from a transmitting terminal and the group velocity of light inside the outbound optical fiber is $2 \times 10^8$ m/s, the signal is expected to be received back at the transmitting terminal in 2 ms within a small error based on group refractive index of the various fiber types used in the system. The error is typically small enough to be in the range of the threshold of the error of delay.

When the lengths of fibers in the system change, the expected range of time for detecting the loop-back signal peaks should be changed to avoid errors in accurate detection of undersea network elements and reporting of faults. For instance, in the previous example wherein the repeater is 200 km away and the loopback signal is expected to be received in 2 ms, it is possible that a temporary terminal configuration change increases the system length from the terminal to the first repeater by 4 km. This temporary terminal configuration change causes the original peak to be marked as undetected at 2 ms and all peaks thereafter may be interpreted as being missing (e.g. the peaks now appear to be at 204 km, 404 km and 604 km instead of 200 km, 400 km and 600 km). In effect, the LMS may interpret all repeaters as missing due to the temporary fiber length change causing the LMS to report a break between the terminal and the first repeater, when the system simply added 4 km of fiber at the terminal. A similar, but related fiber length change can occur during a repair or replacement of a repeater which typically adds two times the ocean depth of fiber at the repair site permanently.

In addition to system length changes, reflection induced anomalies can cause LMS errors. For example, non-loopback based subsea network elements such branching units and Reconfigurable Optical Add Drop Multiplexers (ROADMs) can at times return unexpected HLLB data points in the LMS data along with corresponding loopback delays. Faulty undersea fiber splices may also create similar loopback reflections, as can bends in fiber caused by undersea earthquakes and other geological events. These extra peaks should be ignored by the LMS. However, if an unexpected peak is detected very close to an expected repeater peak, the wrong data point may be interpreted and an erroneous fault may be reported.

BRIEF DESCRIPTION OF THE DRAWINGS

Reference should be made to the following detailed description which should be read in conjunction with the following figures, wherein like numerals represent like parts.

DETAILED DESCRIPTION

In general, a system and method consistent with the present disclosure, provides automatic calibration of LMS loopback data to allow for accurate detection of undersea network elements and reporting of faults in the presence of system length changes and/or reflection induced anomalies. LMS signals are provided from each end of the transmission path and loopback data peaks through the same HLLB path from opposite ends of the system are paired to provide calibrated loopback data for use in identifying network elements and faults in the system.

Figure 1:
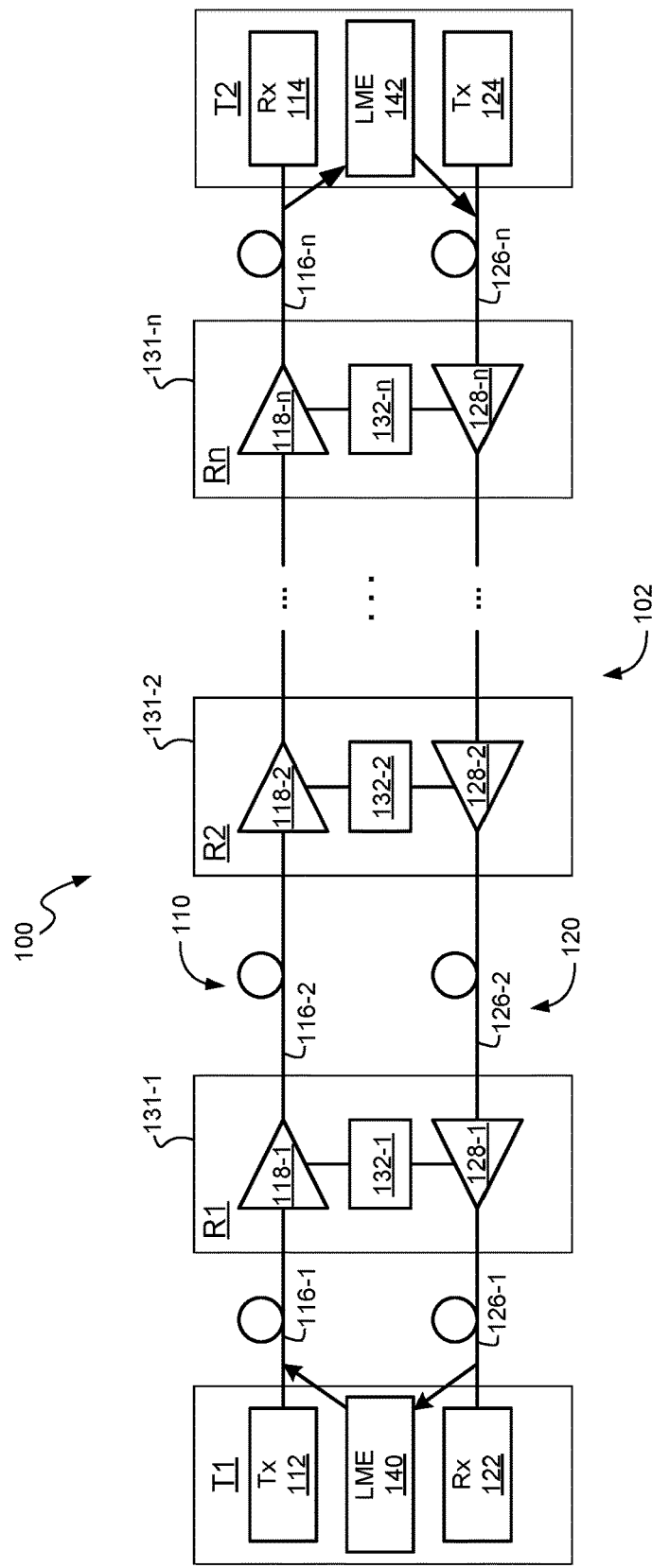
FIG. 1 is a simplified block diagram of one exemplary embodiment of a system consistent with the present disclosure.

FIG. 1 is a simplified block diagram of one exemplary embodiment of WDM transmission system 100 consistent with the present disclosure. In general, the system 100 may be configured to calculate a loop gain value associated with each repeater/amplifier using LMS signals sent from both ends of a bi-directional transmission path 102. Those of ordinary skill in the art will recognize that the system 100 has been depicted as a highly simplified point-to-point system form for ease of explanation. It is to be understood that a system and method consistent with the present disclosure may be incorporated into a wide variety of network components and configurations. The illustrated exemplary embodiments herein are provided only by way of explanation, not of limitation.

As shown, the system 100 may include a first terminal T1 and second terminal T2 coupled by two unidirectional optical paths 110, 120, which together form the bi-directional optical transmission path 102. The first terminal T1 is coupled to a first end of the transmission path 102 and the second terminal T2 is coupled to a second end of the transmission path 102. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The optical path 110 may carry optical data on a plurality of channels (or wavelengths) in one direction from a transmitter 112 in the terminal T1 to a receiver 114 in the terminal T2. The optical path 120 may carry optical data on a plurality of channels (or wavelengths) in a direction opposite from the direction associated with path 110 from a transmitter 124 in the terminal T2 to a receiver 122 in the terminal T1. With respect to terminal T1, the optical path 110 is an outbound path and the optical path 120 is an inbound path. With respect to terminal T2, the optical path 120 is an outbound path and the optical path 110 is an inbound path. The optical path 110 may include an alternating concatenation of optical fibers 116-1 to 116-$n$ and optical amplifiers 118-1 to 118-$n$, and the optical path 120 may include an alternating concatenation of optical fibers 126-1 to 126-$n$ and optical amplifiers 128-1 to 128-$n$.

The optical path pair (e.g., optical paths 110, 120) may include sets of amplifier pairs 118-1 to 118-$n$ and 128-1 to 128-$n$ disposed within housings 131-1 to 131-$n$ of associated repeaters R1 . . . Rn and connected by pairs of optical fibers 116-1 to 116-$n$ and 126-1 to 126-$n$. The pairs of optical fibers 116-1 to 116-$n$ and 126-1 to 126-$n$ may be included in an optical fiber cable together with fibers supporting additional path pairs. Each repeater R1 . . . Rn may include a pair of amplifiers 118-1 . . . 118-$n$ and 128-1 . . . 128-$n$ for each supported path pair. Optical amplifiers 118-1 . . . 118-$n$ and 128-1 . . . 128-$n$ are illustrated in simplified form may include one or more erbium doped fiber amplifiers (EDFAs) or other rare earth doped fiber amplifiers, Raman amplifiers or semiconductor optical amplifiers. A HLLB path 132-1 to 132-$n$ may be coupled between optical paths 110, 120, for example, in one or more of the housings 131-1 to 131-$n$ of the repeaters R1 . . . Rn, and may include, for example, one or more passive optical coupling components, as will be described in greater detail below.

Line monitoring equipment (LME) 140, 142 may be located at both of the terminals T1, T2 to provide HLLB monitoring of the path pair 110, 120. The LME 140 may launch one or more LME test signals, e.g. at different wavelengths and/or different frequencies, into one optical path 110 (e.g., an outbound optical path with respect to LME 140). Each of the HLLB paths 132-1 to 132-$n$ may couple a sample of the LME test signals propagating in optical path 110 into the forward propagating direction of the other optical path 120 (e.g., an inbound optical path with respect to LME 140). The LME 140 may then receive and measure the samples to detect changes in loop gain as an indication of a fault in the system. The received samples of the LME test signals received through HLLB paths 132-1 to 132-$n$ in response to LME test signals are referred to herein as loopback data.

The LME 142 may launch one or more LME test signals, e.g. at different wavelengths and/or different frequencies, into one optical path 120 (e.g., an outbound optical path with respect to LME 142). HLLB paths 132-1 to 132-$n$ may couple a sample of the LME test signals propagating in optical path 120 into the forward propagating direction of the other optical path 110 (e.g., an inbound optical path with respect to LME 142). The LME 142 may then receive and measure the samples (loopback data) to detect changes in loop gain as an indication of a fault in the system. A variety of transmitter and receiver configurations for the LME 140, 142 for transmitting LME test signals and receiving and measuring loopback data are known.

A variety of HLLB path configurations useful in a system consistent with the present disclosure are known. Also, although the each of the repeaters R1 . . . Rn is shown is shown as having an associated HLLB path 132-1 to 132-$n$, the HLLB paths may be located in other locations, such as within the terminals T1, T2, and/or may not be located in every repeater R1 . . . Rn. In some embodiments, the HLLB paths 132-1 to 132-$n$ may be symmetric in operation, i.e., the function that describes the percent of optical power at each wavelength transferred from path 110 to path 120 by a HLLB path 132-1 is the same as the function that describes the percent of optical power at each wavelength transferred from path 120 to path 110 by the HLLB path 132-1. Alternatively, one or more HLLB paths may not be symmetric and different HLLB paths may have different transfer functions.

Advantageously, in a system consistent with the present disclosure any increase in the transmission path length may be automatically detected, and any extra loopback data peaks associated with reflection induced anomalies may be automatically calibrated out of the loopback data to provide accurate calibrated loopback data for detection of network elements and system faults by the LME 140 and LME 142. In general, span length changes and extra LMS test signal peaks may be detected by transmitting LMS test signals from both the LME 140 and LME 142, i.e. from opposite ends of the transmission path 102, and by creating pairs loopback data peaks. References herein to loopback data "peaks" refers to peak amplitude value, power or voltage, of the measured loopback data. Each pair of loopback data peaks includes a loop back data signal peak received in response to LMS test signals from first LME 140 through an HLLB path and an a loopback data peak received in response to LME test signals from the second LME 142 through the same HLLB path. For each pair of loopback data peaks, the total distance traveled by the LME test signal from the first LME 140 plus the total distance traveled by the LME test signal from the second LME 142 should be equal to twice the total length of the transmission path 102.

In a system with a number n of HLLB paths, there should be a total of n pairs of loopback data peaks where the total distance traveled by the pair of LME test signals associated with the loopback data peaks is twice the total length of the transmission path 102. Since extra peaks (e.g. induced by reflections on the transmission path) in the loopback data are typically unidirectional, loopback data peaks from one end of the transmission path that cannot be matched with loopback data peaks from the opposite end of the transmission path to form pair of loopback data peaks may be deemed as extra peaks. These extra peaks may be ignored in the loopback data to provide calibrated loopback data for use in detecting system faults. Also, distance data associated with test signals from the LME 140, 142 at both ends of the transmission path may be calculated from the calibrated loopback data to confirm the total system length and the total length of each span in the system (i.e. the length between repeaters or between a terminal in the first repeater adjacent thereto).

Figure 2:
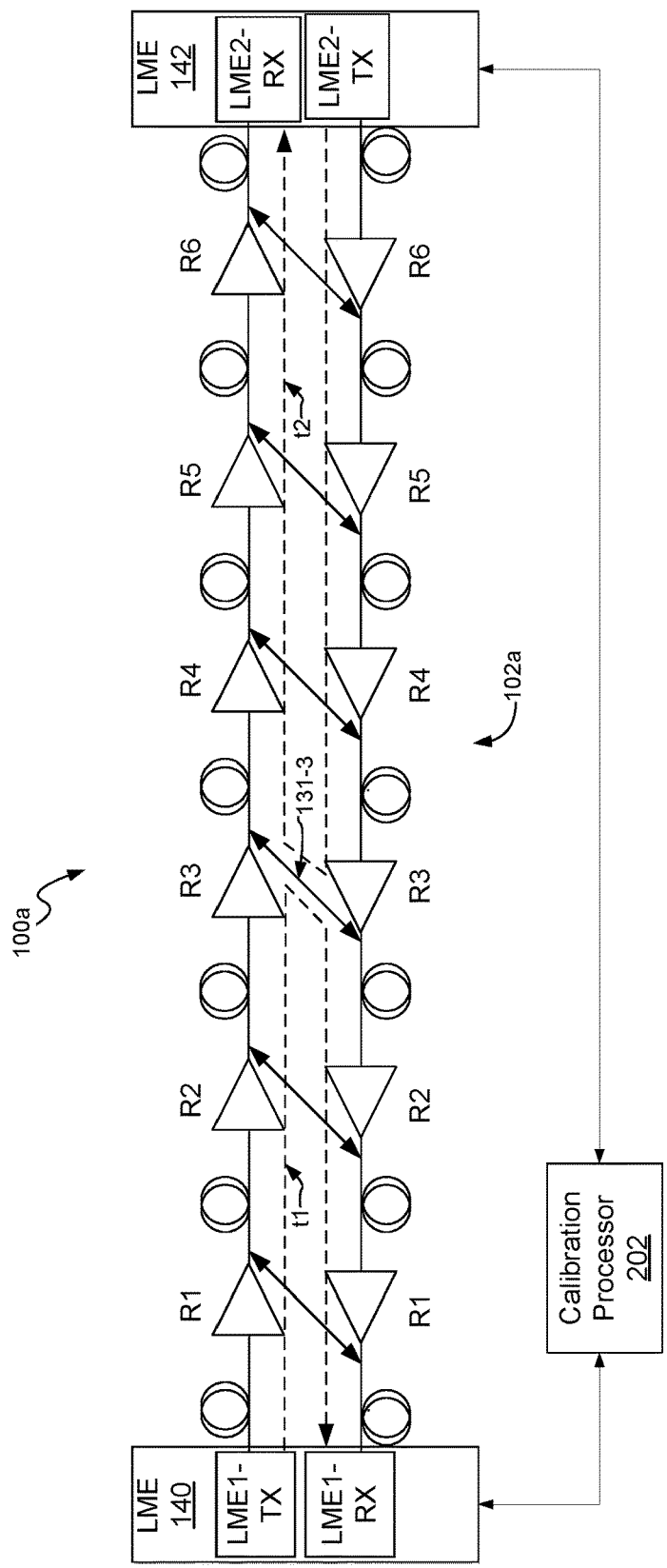
FIG. 2 simplified block diagram of another exemplary embodiment of a system consistent with the present disclosure.

FIG. 2, for example, diagrammatically illustrates a portion of a system 100a consistent with the present disclosure including a first LME 140 and a second LME 142 coupled at opposite ends of a transmission path 102a. The system 100a may be configured as generally described in connection with FIG. 1, except for simplicity and ease of explanation the optical signal transmitters are omitted and only the LME 140, 142 are shown at opposite ends of the transmission path 102a. The illustrated exemplary embodiment includes six repeaters, R1 . . . R6, each of which includes an associated symmetric HLLB path indicated by the bi-directional arrows extending between the amplifier pair of each repeater R1 . . . R6.

The LME 140 includes an LME test signal transmitter LME1-TX that transmits an LME test signal on the transmission path 102a and an LME test signal receiver LME1-RX that receives loopback data in response to the LME test signal from the LME 140. The LME 142 includes an LME test signal transmitter LME2-TX that transmits an LME test signal on the transmission path 102a and an LME test signal receiver LME2-RX that receives loopback data in response to the LME test signal from the LME 142.

The loopback data from each LME 140 and 142 may be provided to a calibration processor. The calibration processor 202 may be a local processor in one or both LME's, a processor in a network management system, or any other processor in the system. The calibration processor 202 identifies pairs of peaks in the loopback data from the LME 140 and LME 142 to identify extra peaks, e.g. resulting from reflection induced anomalies, and to confirm the total length of the transmission path and the spans within the transmission path. In FIG. 2, for example, the loop back data peak resulting from the LME test signal t1 from LME 140 that passes through the HLLB path 131-3 of the repeater R3 may be paired with the loopback data peak resulting from the LME test signal t2 from LME 142 that passes through the HLLB path 131-3 of the repeater R3. The total distance traveled by this pair of LME test signals is twice the total length of the transmission path 102a.

A total of eight pairs of loopback data peaks, i.e. one for each repeater and one at each transmitting terminal (e.g. T1 and T2 in FIG. 1), may be identified by the calibration processor 202 in the system illustrated in FIG. 2. Each peak in the loopback data from one LME 140, 142 should be paired with a peak in loopback data from the opposite LME 140, 142 for the same HLLB path and the total distance traveled by the LME test signals as represented by each pair peaks through the same HLLB path should be twice the total length of the transmission path. Any loopback data peak from LME 140 or 142 that does not form a pair with a LME loopback data peak from the opposite LME 140, 142 may be calibrated out of the loopback data used in the system by the calibration processor 202.

Tables 1-4 below, for example, illustrate, calibrated and uncalibrated loopback distance data calculated from loopback data to illustrating performance of an example system and method consistent with the system 100a shown in FIG. 2. Each numerical distance data entry in the table was calculated from a loopback data peak, and for ease of explanation each entry is referred to as a peak. In the tables below, the "Peak #" is representative of order of the peaks in the loopback data received at LME 140 connected at one end of the transmission path and the order of the peaks in the loopback data received at LME 142 connected at the opposite end of the transmission path, as indicated. The reference "T1" refers to the loopback path of the terminal in which the LME 140 is located (terminal T1 in FIG. 1) and the reference "T2" refers to the loopback path of the terminal in which the LME 142 is located (terminal T2 in FIG. 1).

Table 1, below, for example, illustrates the loopback data for the system prior to an increase of the transmission path length:

TABLE 1

| Peak # | 1 | 2 | 3 | 4 | 5 | 6 | 7 | 8 |
|---|---|---|---|---|---|---|---|---|
| LME 140(km) | 0 | 34.4 | 93.6 | 152.8 | 182.0 | 241.2 | 300.4 | 364.8 |
| LME 142(km) | 0 | 64.4 | 123.6 | 182.8 | 212.0 | 271.2 | 330.4 | 364.8 |

In Table 1, Peak 1 for the LME 140 refers to the peak associated with the loopback path in the transmitting terminal containing the LME 140, Peak 2 refers to the peak associated with the repeater R1, Peak 3 refers to the peak associated with the repeater R2, and so on. Peak 1 for the LME 142 refers to the peak associated with the loopback path in the transmitting terminal containing the LME 142, Peak 2 refers to the peak in associated with the repeater R6, Peak 3 refers to the peak associated with the repeater R5, and so on.

From the data shown in Table 1, eight pairs of peaks can be created, each pair including a peak associated with a test signal from different one of the LMEs 140, 142 but traveling through the same HLLB path and each pair reflecting a distance traveled by the test signals equal to twice the total length of the transmission path 102a. For example, with reference also to FIG. 2, "Peak 4" for LME 140 in Table 1 reflects the distance traveled by the LME test signal t1 from LME 140 through the HLLB path 131-3 of repeater R3 and the "Peak 5" for LME 142 in Table 1 reflects the distance traveled by the LME test signal t2 from LME 142 through the HLLB path 131-3 of repeater R3. The "Peak 4" for LME 140 and "Peak 5" for LME 142 thus form a pair and the total distance traveled by the test signal associated with as "Peak 4" in Table 1 (152.8 km in the example) plus the total distance traveled by the test signal associated with "Peak 5" in Table 1 (212.0 km in the example) is twice the total distance of the transmission path, i.e. the length of the transmission path is 364.8/2=182.4 km. Also, the loopback data for both the LME 140 and the LME 142 in Table 1 both confirm span lengths of 34.4 km/2, 59.2 km/2, 59.2 km/2, 29.2 km/2, 59.2 km/2, 59.2 km/2 and 64.4 km/2 for a total length of the transmission span of 182.4 km Table 2, below illustrates the loopback data for the system after an increase of the transmission path length:

TABLE 2

| Peak # | 1 | 2 | 3 | 4 | 5 | 6 | 7 | 8 | 9 | 10 | 11 |
|---|---|---|---|---|---|---|---|---|---|---|---|
| LME 140(km) | 1 | 34.4 | 93.6 | 110 | 152.8 | 182.0 | 210 | 242.0 | 301.2 | 310 | 365.6 |
| LME 142(km) | 0 | 64.4 | 123.6 | 183.6 | 212.8 | 272.0 | 331.2 | 365.6 | 380 | | |

Figure 3:
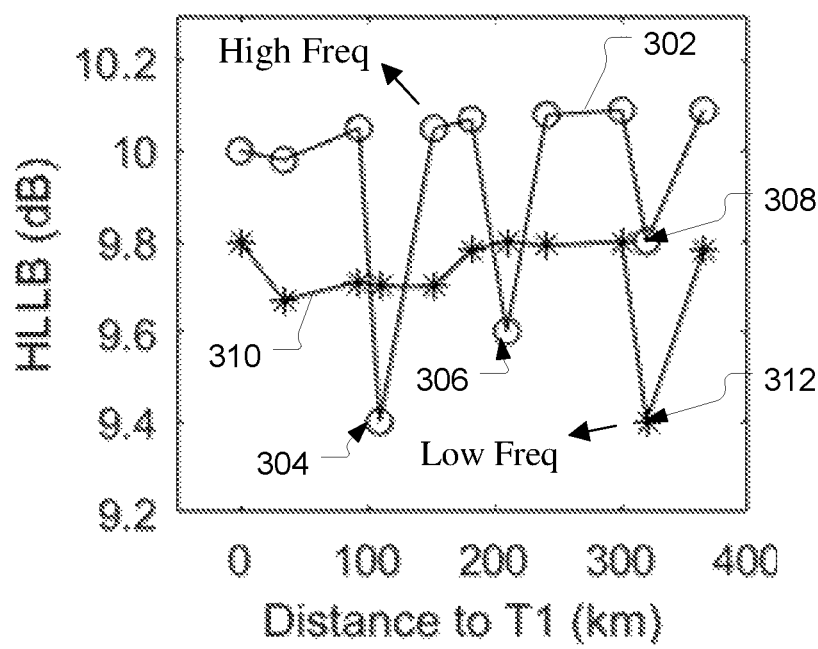
FIG. 3 is an uncalibrated plot of loop gain vs. distance from a transmitting terminal at a first end of a system consistent with the present disclosure.
Figure 4:
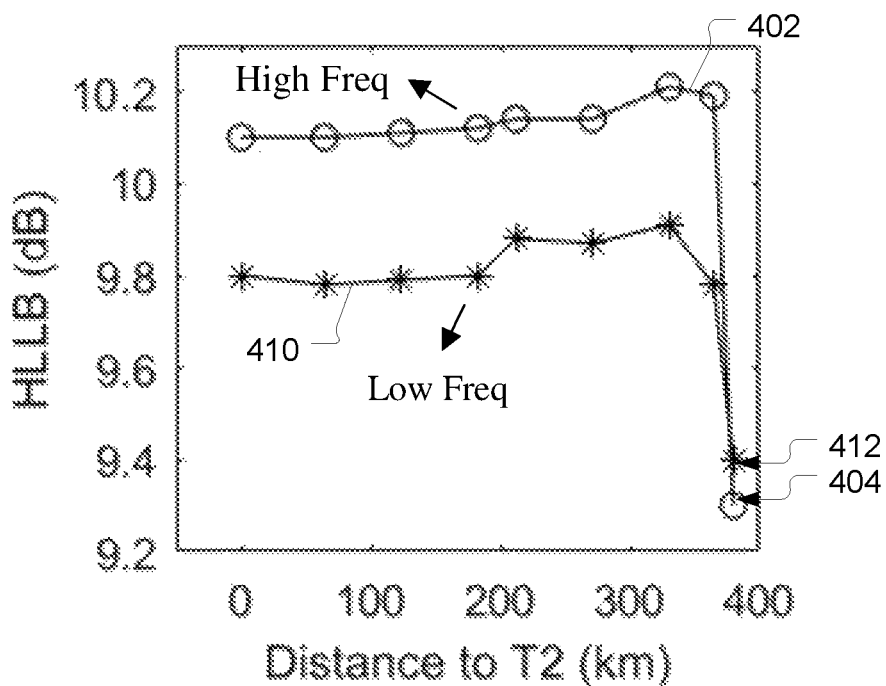
FIG. 4 is an uncalibrated plot of loop gain vs. distance from a transmitting terminal at a second end of the system associated with the plot shown in FIG. 3.

Table 2 illustrates three additional peaks for the LME 140 and one additional peak for the LME 142 compared to Table 1 (which is the data for the system prior to an increase of the transmission path length). FIG. 3 includes a plot 302 of the loopback data associated with the distance data shown in Table 2 for the LME 140 with the additional peaks in the loopback data shown at 304, 306 and 308, and FIG. 4 includes a plot 402 of the loopback data associated with the distance data shown in Table 2 for the LME 142 with an additional peak shown at 404. The plots 302 and 402 in FIGS. 3 and 4 show loopback data associated with high frequency LME test signals from the LME 140 and LME 142. FIGS. 3 and 4 also include plots 310 and 410, respectively, of loopback data associated with low frequency LME test signals from the LME 140 and LME 142. Plot 310 shows an additional peak at 312 for the low frequency test signal from LME 140 and plot 410 shows an additional peak at 412 for the low frequency test signal from the LME 142.

Table 3 shows the loopback data pairs that may be formed form the data shown in Table 2 (and illustrated in plots 302 and 402 of FIGS. 3 and 4.)

TABLE 3

| | T1 | R1 | R2 | R3 | R4 | R5 | R6 | T2 |
|---|---|---|---|---|---|---|---|---|
| LME 140(km) | 1 | 34.4 | 93.6 | 152.8 | 182.0 | 242.0 | 301.2 | 365.6 |
| LME 142(km) | 365.6 | 331.2 | 272.0 | 212.8 | 183.6 | 123.6 | 64.4 | 0 |

As shown, eight loopback data pairs may be formed form the data shown in Table 2, one pair each for the terminal (T1) in which the LME 140 is provided), the repeaters R1-R6, and the terminal (T2) in which the LME 142 is provided. No pairs could be created for the Peak 4, Peak 7 or Peak 10 for the LME 140 in Table 2, or for Peak 9 for the LME 142 in Table 2. In a system and method consistent with the present disclosure, because pairs could not be formed for these peaks, they may be considered to be extra peaks and may be removed from the loopback data to provide calibrated loopback data for use in the system.

Table 4 below illustrates the calibrated loopback data for the system after the increase of the transmission path length with the extra peaks omitted from the calibrated loopback data:

TABLE 4

| Peak # | 1 | 2 | 3 | 4 | 5 | 6 | 7 | 8 |
|---|---|---|---|---|---|---|---|---|
| LME 140(km) | 0 | 34.4 | 93.6 | 152.8 | 182.0 | 242.0 | 301.2 | 365.6 |
| LME 142(km) | 0 | 64.4 | 123.6 | 183.6 | 212.8 | 272.0 | 331.2 | 365.6 |

Figure 5:
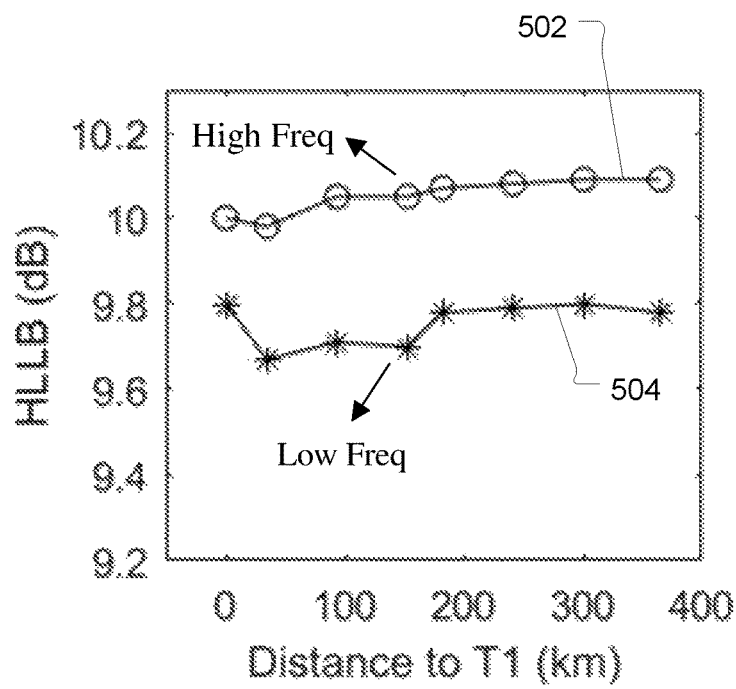
FIG. 5 is a calibrated plot of loop gain vs. distance from a transmitting terminal at the first end of the system associated with the plots show in FIGS. 3 and 4.
Figure 6:
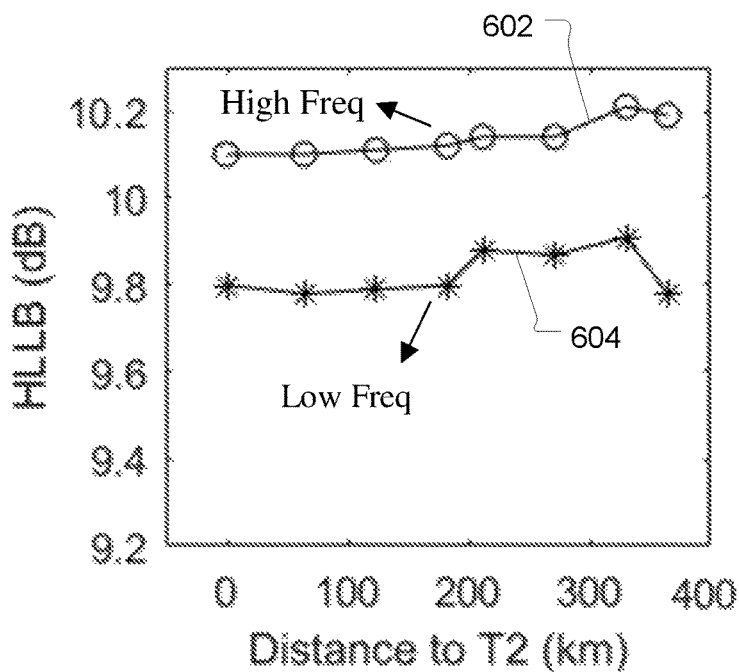
FIG. 6 is a calibrated plot of loop gain vs. distance from a transmitting terminal at the second end of the system associated with the plots show in FIGS. 3 and 4.

Table 4 includes the data from Table 2 except for the data associated with the extra peaks, i.e. Peak 4, Peak 7 and Peak 10 for the LME 140 in Table 2, and for Peak 9 for the LME 142 in Table 2. FIG. 5 includes a plot 502 of the calibrated loopback data associated with the data shown in Table 4 for the LME 140, and FIG. 6 includes a plot 602 of the loopback data associated with the data shown in Table 4 for the LME 142. FIGS. 5 and 6 also include plots 504 and 604, respectively, of the calibrated loopback data associated with low frequency LME test signals from the LME 140 and LME 142. Plot 502 shows that the additional peaks at 304, 306 and 308 for the low frequency test signal from LME 140 in FIG. 3 have been removed from the calibrated data and plot 602 shows that the additional peak at 404 for the low frequency test signal from the LME 142 has been removed from the calibrated loopback data. In this example, the data for Table 4 is calibrated loopback data may be used as the system loopback data in the system for identification of network components and system faults. Also, the loopback data for both the LME 140 and the LME 142 in Table 4 both confirm span lengths of 34.4 km, 59.2 km, 59.2 km, 29.2 km, 60 km, 59.2 km and 64.4 km, for a total length of the transmission span of 365.6 km.

Figure 7:
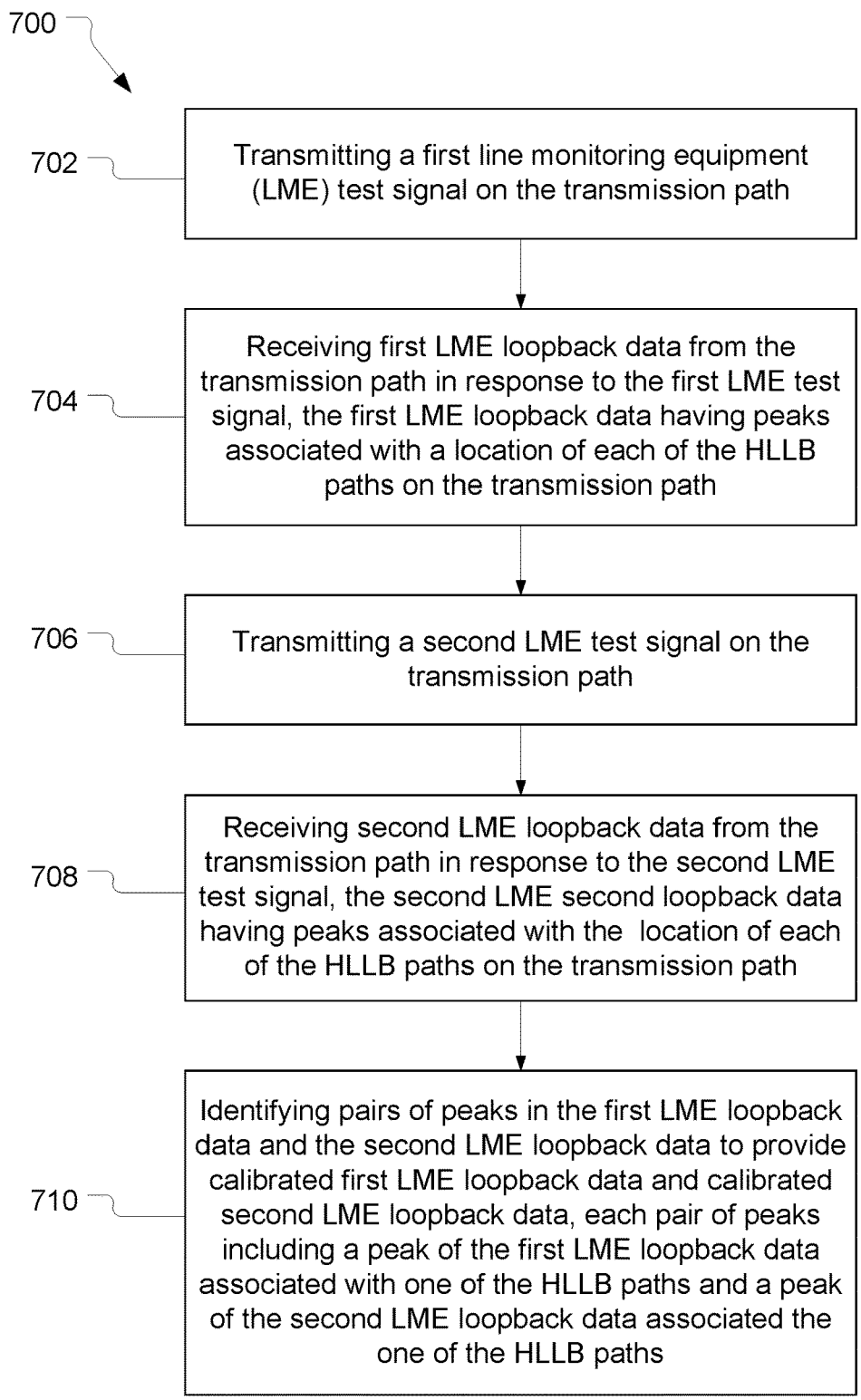
FIG. 7 is a flow chart illustrating operations according to a method consistent with the present disclosure.

FIG. 7 is a flow chart illustrating one example of a method 700 consistent with the present disclosure. In the illustrated embodiment, the method includes transmitting 702 a first line monitoring equipment (LME) test signal on the transmission path; receiving 704 first LME loopback data from the transmission path in response to the first LME test signal, the first LME loopback data having peaks associated with a location of each of the HLLB paths on the transmission path; transmitting 706 a second LME test signal on the transmission path; and receiving 708 second LME loopback data from the transmission path in response to the second LME test signal, the second LME second loopback data having peaks associated with the location of each of the HLLB paths on the transmission path. The method further includes identifying 710 pairs of peaks in the first LME loopback data and the second LME loopback data to provide calibrated first LME loopback data and calibrated second LME loopback data, each pair of peaks including a peak of the first LME loopback data associated with one of the HLLB paths and a peak of the second LME loopback data associated the one of the HLLB paths.

In some embodiments, the loopback signal data for the LME 140 or LME 142 may include peaks that are too close to each other to be within a range of detection error. In such a case, the peaks may be compared against each other to determine which peak is the valid peak associated with a repeater loopback path. In some embodiments, for example, the peaks may be averaged by the LME receiver to estimate the accuracy A with:

$$A = \frac{1}{\sqrt{\sum_{n=0}^{N} |P_n - \overline{P}|^2}}$$

Where $P_n$ is the power of the n-th peak, $\overline{P}$ is the average of the power of peaks, and N is the total number of peaks identified as being too close to each other. The peak with highest accuracy A may be retained in the loopback data and the other peaks may be omitted from the loopback data before pairing peaks in the loopback data.

While FIG. 7 illustrates various operations according to an embodiment, it is to be understood that not all of the operations depicted in FIG. 7 are necessary for other embodiments. Indeed, it is fully contemplated herein that in other embodiments of the present disclosure, the operations depicted in FIG. 7, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

There is thus provided a system and method for automatically calibrating loopback data in a line monitoring system of an optical communication system. Extra peaks in loopback data are calibrated out of the loopback data used by the system by identifying pairs of peaks in the loopback data associated with test signal transmissions from opposite ends of the optical transmission path.

According to one aspect of the disclosure there is provided an optical communication system including: an optical transmission path; a plurality of repeaters coupled to the transmission path, each of the repeaters comprising a high loss loopback (HLLB) path; first line monitoring equipment (LME) coupled to a first end of the transmission path, the first LME being configured to transmit first LME test signals on the transmission path and receive first LME loopback data from the transmission path in response to the LME test signals, the first LME loopback data comprising a peak associated with the location of each of the HLLB paths on the transmission path; second line monitoring equipment (LME) coupled to a second end of the transmission path, the second LME being configured to transmit second LME test signals on the transmission path and receive second LME loopback data from the transmission path in response to the second LME test signal, the second LME loopback data comprising a peak associated with the location of each of the HLLB paths on the transmission path; and a calibration processor. The calibration processor is configured to identify pairs of peaks in the first LME loopback data and the second LME loopback data to provide calibrated first LME loopback data and calibrated second LME loopback data, each pair of peaks including a peak of the first LME loopback data associated with one of the HLLB paths and a peak of the second LME loopback data associated the one of the HLLB paths.

According to yet another aspect of the disclosure there is provided a method of calibrating loopback data in an optical communication system including an optical transmission path and a plurality of repeaters coupled to the transmission path, each of the repeaters comprising a high loss loopback (HLLB) path. The method includes: transmitting a first LME test signal on the transmission path; receiving first LME loopback data from the transmission path in response to the first LME test signal, the first LME loopback data having peaks associated with a location of each of the HLLB paths on the transmission path; transmitting a second LME test signal on the transmission path; receiving second LME loopback data from the transmission path in response to the second LME test signal, the second LME second loopback data having peaks associated with the location of each of the HLLB paths on the transmission path; and identifying pairs of peaks in the first LME loopback data and the second LME loopback data to provide calibrated first LME loopback data and calibrated second LME loopback data, each pair of peaks including a peak of the first LME loopback data associated with one of the HLLB paths and a peak of the second LME loopback data associated the one of the HLLB paths.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

Embodiments of the methods described herein may be implemented using a controller, processor and/or other programmable device. To that end, the methods described herein may be implemented on a tangible, non-transitory computer readable medium having instructions stored thereon that when executed by one or more processors perform the methods. Thus, for example, the calibration processor 202 may include a storage medium to store instructions (in, for example, firmware or software) to perform the operations described herein. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as "processor", may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. An optical communication system comprising:
   an optical transmission path;
   a plurality of repeaters coupled to the optical transmission path, each of the repeaters comprising a high loss loopback (HLLB) path;
   first line monitoring equipment (LME) coupled to a first end of the transmission path, the first LME being configured to transmit first LME test signals on the transmission path and receive first LME loopback data from the transmission path in response to the LME test signals, the first LME loopback data comprising a peak associated with the location of each of the HLLB paths on the transmission path;
   second LME coupled to a second end of the transmission path, the second LME being configured to transmit second LME test signals on the transmission path and receive second LME loopback data from the transmission path in response to the second LME test signal, the second LME loopback data comprising a peak associated with the location of each of the HLLB paths on the transmission path; and
   a calibration processor configured to:
      identify pairs of peaks in the first LME loopback data and the second LME loopback data to provide calibrated first LME loopback data and calibrated second LME loopback data, each pair of peaks including a peak of the first LME loopback data associated with one of the HLLB paths and a peak of the second LME loopback data associated with the one of the HLLB paths,
      compare a plurality of the peaks in the first LME loopback data to identify which peak of the plurality of peaks in the first LME loopback data is associated with the first LME test signal passing through an associated one of the HLLB paths,
      calculate an accuracy for each of the plurality of peaks, and
      identify one of the plurality of peaks having the highest associated accuracy as the peak of the first LME loopback data associated with the first LME test signal passing through the associated one of the HLLB paths.

2. The optical communication system according to claim 1, wherein the calibration processor is configured to omit any peak in the first LME loopback data from the calibrated first LME loopback data that does not have a pair in the second LME loopback data.

3. The optical communication system according to claim 1, wherein the calibration processor is configured to omit any peak in the second LME loopback data from the calibrated second LME loopback data that does not have a pair in the first LME loopback data.

4. The optical communication system according to claim 1, wherein the accuracy (A) for each of the plurality of peaks is given by:

$$A = \frac{1}{\sqrt{\sum_{n=0}^{N} |P_n - \overline{P}|^2}}$$

where $P_n$ is the power of the nth one of the plurality of peaks, $\overline{P}$ is the average of the power of the plurality of peaks, and N is the total number of the plurality of peaks.

5. A method of calibrating loopback data in an optical communication system including an optical transmission path and a plurality of repeaters coupled to the optical transmission path, each of the repeaters comprising a high loss loopback (HLLB) path, the method comprising:
   transmitting a first line monitoring equipment (LME) test signal on the transmission path;
   receiving first LME loopback data from the transmission path in response to the first LME test signal, the first LME loopback data having peaks associated with a location of each of the HLLB paths on the transmission path;
   transmitting a second LME test signal on the transmission path;
   receiving second LME loopback data from the transmission path in response to the second LME test signal, the second LME second loopback data having peaks associated with the location of each of the HLLB paths on the transmission path;
   identifying pairs of peaks in the first LME loopback data and the second LME loopback data to provide calibrated first LME loopback data and calibrated second LME loopback data, each pair of peaks including a peak of the first LME loopback data associated with one of the HLLB paths and a peak of the second LME loopback data associated with the one of the HLLB paths;
   comparing a plurality of the peaks in the first LME loopback data to identify which peak of the plurality of peaks in the first LME loopback data is associated with the first LME test signal passing through an associated one of the HLLB paths;
   calculating an accuracy for each of the plurality of peaks; and
   identifying the one of the plurality of peaks having the highest associated accuracy as the peak of the first LME loopback data associated with the first LME test signal passing through the associated one of the HLLB paths.

6. The method according to claim 5, the method further comprising omitting any peak in the first LME loopback data from the calibrated first LME loopback data that does not have a pair in the second LME loopback data.

7. The method according to claim 5, the method further comprising omitting any peak in the second LME loopback data from the calibrated second LME loopback data that does not have a pair in the first LME loopback data.

8. The method according to claim 5, wherein the comparing of the plurality of the peaks in the first LME loopback is before the identifying pairs of peaks in the first LME loopback data and second LME loopback data.

9. The method according to claim 8, wherein the accuracy (A) for each of the plurality of peaks is given by:

$$A = \frac{1}{\sqrt{\sum_{n=0}^{N} |P_n - \overline{P}|^2}}$$

where $P_n$ is the power of the nth one of the plurality of peaks, $\overline{P}$ is the average of the power of the plurality of peaks, and N is the total number of the plurality of peaks.

* * * * *